United States Patent [19]

Gupta et al.

[11] Patent Number: 5,793,755
[45] Date of Patent: Aug. 11, 1998

[54] ECHO SUPPRESSOR FOR FACSIMILE CALLS IN A SATELLITE NETWORK

[75] Inventors: Prabhat K. Gupta; Sanjay Gupta, both of Germantown; Paul Gaske, Rockville; Bob Kepley, Gaithersburg, all of Md.

[73] Assignee: Hughes Electronics Corporation, El Segundo, Calif.

[21] Appl. No.: 499,421

[22] Filed: Jul. 7, 1995

[51] Int. Cl.⁶ ........................................... H04B 3/20
[52] U.S. Cl. ...................... 370/286; 370/296; 379/406
[58] Field of Search ................................ 370/286, 289, 370/287, 278, 282, 296; 379/410, 406, 407

[56] References Cited

U.S. PATENT DOCUMENTS

| | | |
|---|---|---|
| 3,700,810 | 10/1972 | Richeson, Jr. et al. ............ 379/93.37 |
| 4,357,491 | 11/1982 | Daaboul et al. . |
| 4,363,938 | 12/1982 | Daaboul et al. . |
| 4,368,360 | 1/1983 | Sato et al. ........................ 379/405 |
| 4,519,081 | 5/1985 | Sugie ............................. 371/57.1 |
| 4,712,235 | 12/1987 | Jones, Jr. ........................ 379/410 |
| 5,216,519 | 6/1993 | Daggett et al. ................... 358/434 |
| 5,535,194 | 7/1996 | Ashley et al. .................... 370/289 |
| 5,633,936 | 5/1997 | Oh ................................. 381/66 |

*Primary Examiner*—Min Jung
*Attorney, Agent, or Firm*—John Whelan; Michael Sales

[57] ABSTRACT

A signal classifier and a echo suppressor for a facsimile calls in an echo prone network. The signal classifier quickly and reliably differentiates facsimile calls from voice and modem calls. The echo suppressor suppresses echo and has a variable hangover time which avoids attenuating and distorting a return transmission signal.

14 Claims, 5 Drawing Sheets

ECHO SUPPRESSOR FOR FACSIMILE CALLS IN A SATELLITE NETWORK

BACKGROUND OF THE INVENTION

In satellite communication systems, facsimile call retention rates can often be low. Call retention is defined as the ability to complete a facsimile call and reliably transmit two or more pages. Typically, network delay and echo are responsible for the failure of facsimile transmissions. Satellite communication networks have a inherent delay introduced due to the time a signal takes to travel between a terrestrial station and the satellite. For a satellite in geosynchronous earth orbit, the one-way delay is approximately 250 msecs. This delay combined with an echo condition in the network has an adverse effect on the performance of the facsimile machine. Many facsimile machines will either fail to successfully complete a call or transmit multiple pages.

Several mechanisms related to the echo in the network may be responsible for the failure of facsimile calls. The echo could be misinterpreted as a protocol message and thus interrupt the handshaking protocol between the two facsimile machines. The echo also reduces the signal-to-noise (S/N) ratio, degrading the quality of the image transmission. The echo could also be mistaken for a training sequence at the end of the T.30 message. Reliable echo suppression is thus required on facsimile calls in a network having an echo condition, such as in a satellite communication network.

Existing echo suppression schemes are not effective for several reasons. For example, echo suppressors according to ITU Recommendation G.164 are ineffective because of the short and fixed recommended hangover times of 24 to 36 msecs, associated with the state transitions. Typically, echo suppressors operate in a half-duplex mode. When a signal arrives at the receive port, the suppression is activated and remains active until there is no signal present for a period of time, recommended by G.164 to be 24 to 36 msecs. T.30 protocol, however, specifies the guard time between V.21 and V.29 transmission. For example, a V.21 message-response sequence or a V.21/V.29 sequence such as a confirm to receive (CFR) followed by training, should have a guard time of approximately 75+/−20 msecs. However, facsimile machines may deviate from this protocol and send a return message during the guard time. If a return signal from the facsimile machine reaches the echo suppressor transmit port within 24 to 36 ms of the termination of the signal at the receive port, the persistence of the echo suppressor may mistake the quick return signal for an echo and introduce an unwanted attenuation.

The echo suppressor may also mistake a high level of echo as a transmit signal and declare double talk. If the echo level is high enough, the echo suppressor may enter the double-talk mode in which a receive loss is inserted. Thus, the echo is not completely suppressed during the assumed double talk. However, if echo suppressors are at both ends of the connection and both are in double talk mode, the result is an unnecessary reduction in the levels of the facsimile transmit signals.

Echo cancelers designed according to ITU Recommendation G.165 are not effective because they train on the T.30 protocol messages transmitted using V.21 modulation schemes. These signals are narrow bandwidth in nature and the echo cancelers typically do not converge well enough to provide a high echo return loss during transitions from narrow-band to wide-band image signals. Also, the time available may not be enough to achieve convergence. The non-linear processor might not be activated and the residual echo then ends up returned over the channel.

Accordingly, there is a need for a device and method that can improve call retention rates in facsimile calls over a satellite communication system by reducing the amount of echo in the network. By reducing the echo in the network, the failure mechanisms are reduced. There is also a need for an echo suppressor which will not attenuate and distort a quick return signal from another facsimile machine.

SUMMARY OF THE INVENTION

The present invention relates to signal classifier for identifying facsimile calls and a method for suppressing echo during facsimile transmissions. The preferred embodiment of the present invention monitors a call and reliably classifies the call as a facsimile call. The echo suppressor is then enabled for the facsimile call.

The echo suppressor suppresses any near-end echo as long as there is energy on the receive terminal. After the receive signal is no longer present, the echo suppressor is activated for a variable period of time, with preferably a maximum period of 50 msecs. The activated echo suppressor blocks any near-end signal and inserts zeros for the actual signal as long as the transmit signal does not change from a steady state value. However, if the transmitted signal varies beyond the steady state value within the 50 msec time period, the echo suppressor is immediately deactivated. This guarantees a fast turnaround time without excessive suppressor hangover which may distort a return signal. The echo suppressor is also deactivated if energy is detected in the lower band indicating a false classification or switchover to a voice mode of operation.

The signal classifier of the preferred embodiment of the invention reliably identifies facsimile transmission calls. The echo suppressor technique of the preferred embodiment of the present invention controls unwanted echo signals which degrade the quality of facsimile transmissions. The echo suppressor technique of the present invention also provides a fast turnaround time without excessive suppressor hangover. The present invention can dramatically improve facsimile call retention rates.

DETAILED DESCRIPTION OF THE PRESENTLY PREFERRED EMBODIMENT

The preferred embodiment of the present invention is comprised of two parts: a signal classifier and an echo suppressor. The signal classifier monitors the transmission signal to identify the call as a facsimile call. On facsimile calls, the echo suppressor suppresses echo on the transmit port if there is a signal present on the receive port with an associated hangover which ramps up to a maximum value of 50 msecs.

Figure 1:
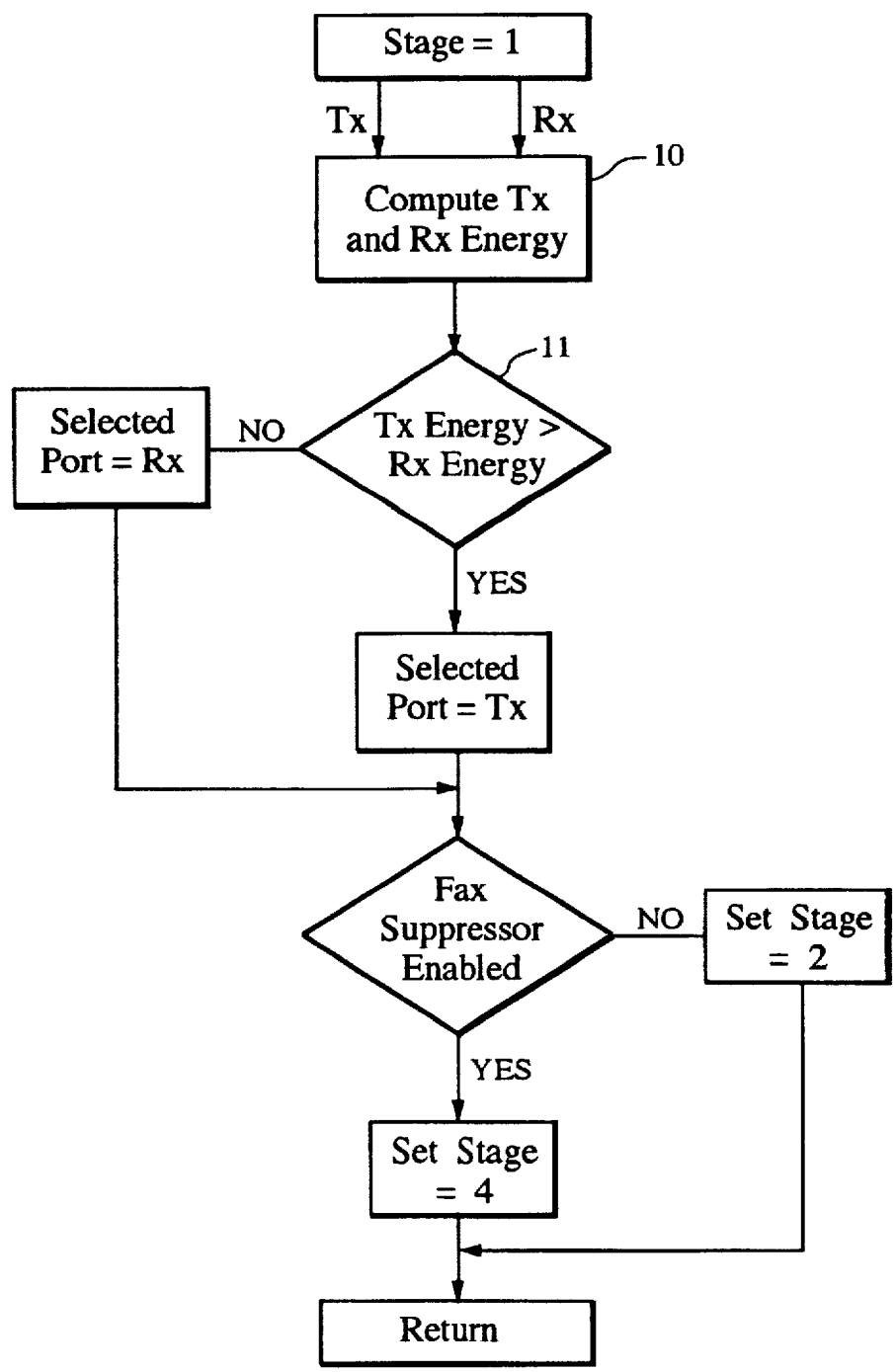
FIGS. 1–4 show a flow diagram of stages 1–4, respectively, of the signal classifier.
Figure 2:
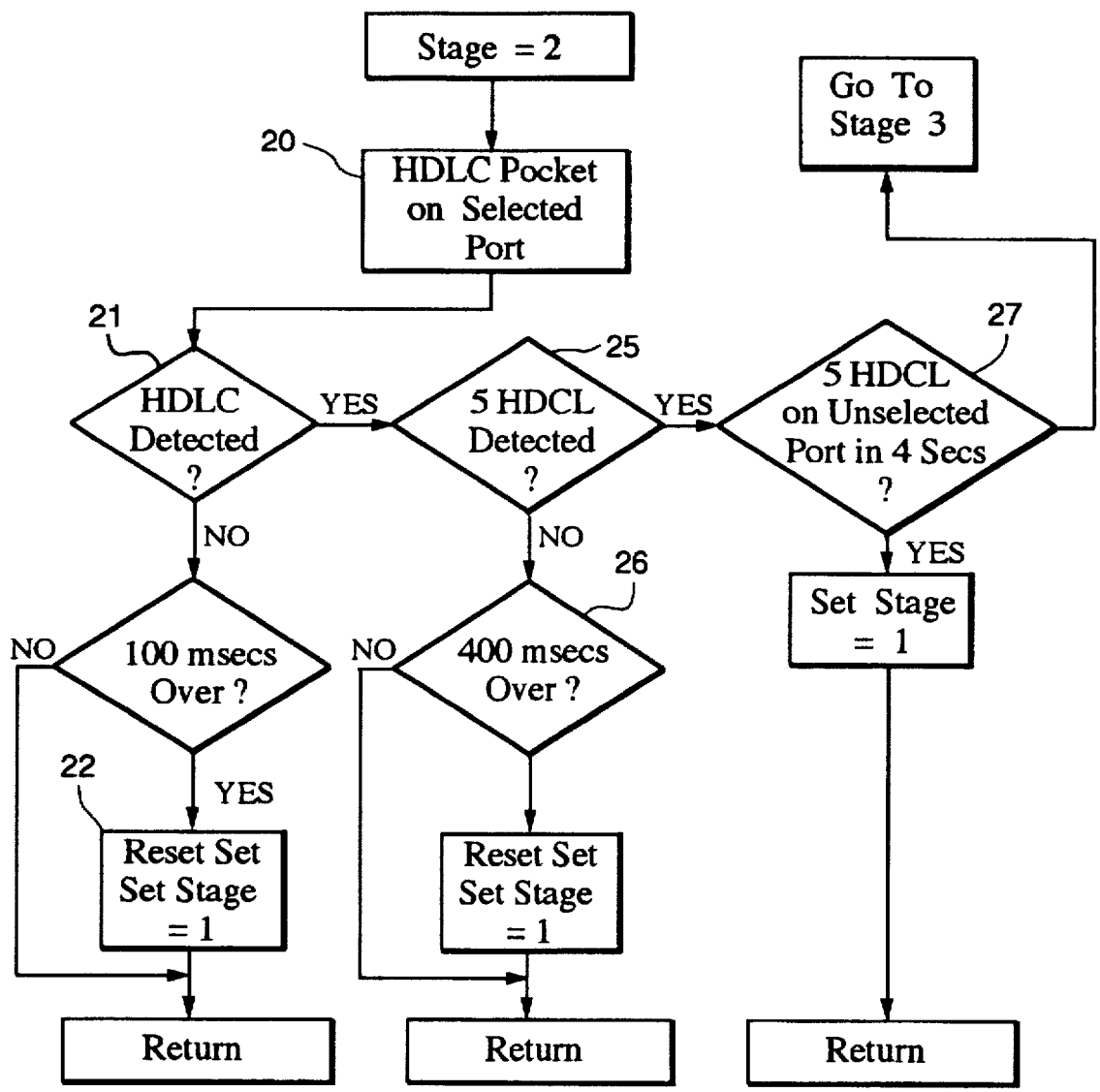

To identify a facsimile call, the signal classifier preferably looks for the message response sequence as defined in the T.30 protocol. The T.30 protocol specifies that each message be preceded by a one second header consisting of the high level data link control (HDLC) packet. As seen in FIG. 1, the transmit and receive ports are both monitored to determine the port 10 with the higher energy signal level 11. On the selected higher energy port, the signal classifier attempts to detect the presence of the HDLC packet 20, as shown in FIG. 2. The HDLC packet precedes each message-response with a one second header consisting of packets 0×7E, the HDLC handshake. Preferably, the HDLC header is transmitted using the V.21 Ch2 FSK modulation scheme, i.e. 1650 Hz for mark and 1850 Hz for space. The mark frequency will be on for 6 bit times (20 msecs) and then the space frequency will be on for 2 bit times (6.66 msecs).

As seen in FIG. 2, if the HDLC pattern is not detected 21 within about 100 msecs 22 preferably, the state is reset 22. If a HDLC packet is detected 21, the signal classifier will preferably attempt to identify 5 HDLC packets 25 within 400 msecs 26. Of course, detecting a greater or fewer number of packets in a longer or shorter period of time may be chosen by one skilled in the art. If the HDLC pattern is detected, the call is either a facsimile call or a V.21 voice data modem transmitting HDLC packets.

Figure 3:
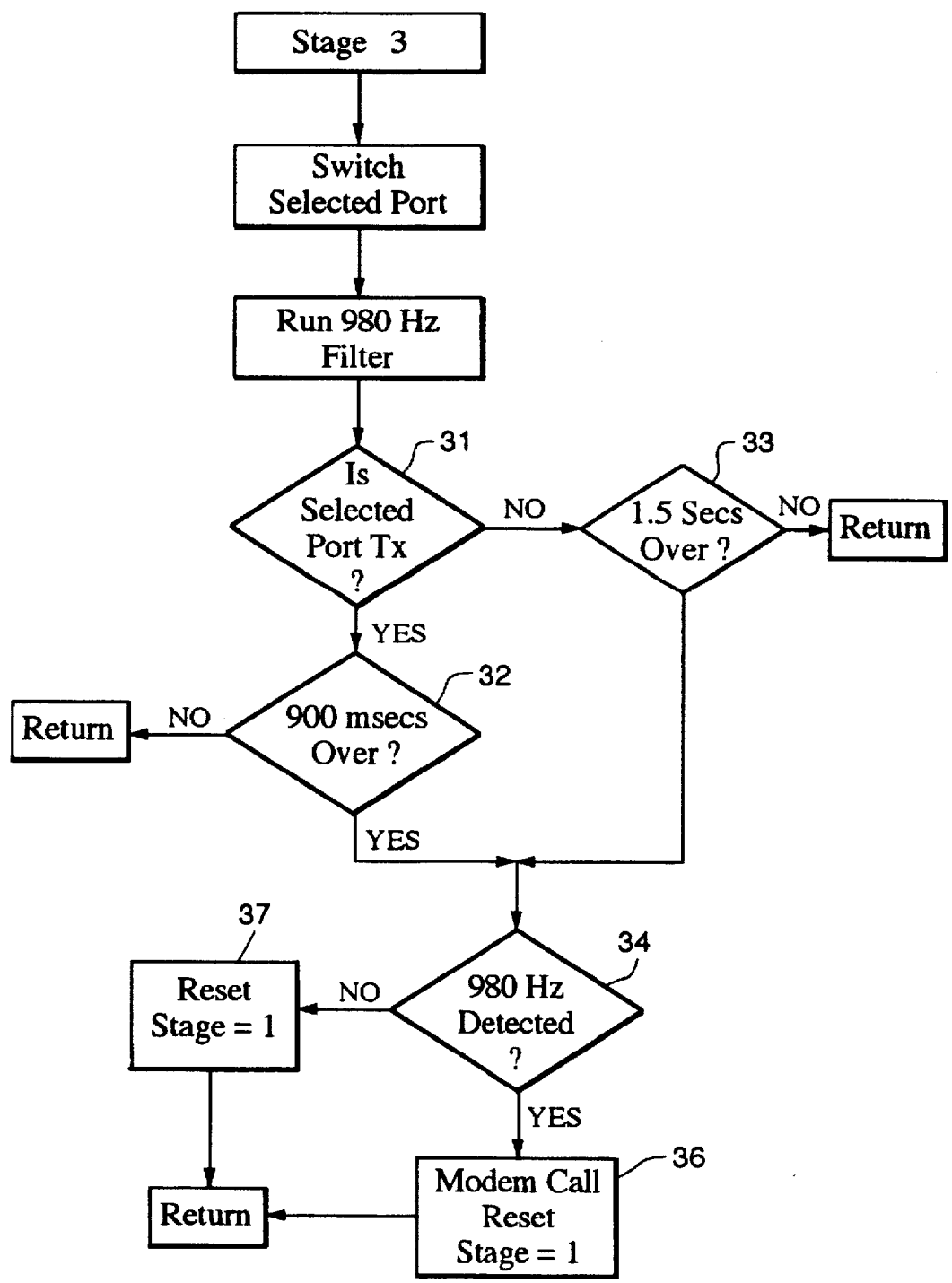

As shown in FIG. 3, to determine whether the call is a facsimile or a V.21 voice data modem call, the presence of a 980 Hz signal on the other port is checked. If the other port is the transmit port 31, the 980 Hz signal will be looked for on the other port for preferably about 900 msecs 32 before determining that the 980 Hz signal is not present. If the other port is the receive port, the 980 Hz signal will preferably be looked for 1500 msecs 33 before determining that the 980 Hz signal is not present. Once the 980 Hz signal is detected 34, the call is classified as a V.21 voice band data modem call 36, not a facsimile call.

If the 980 Hz signal is not detected, the signal classifier then preferably again attempts to detect HDLC packets in the higher frequency band used by facsimile transmissions 37. Preferably, if 5 HDLC packets are detected within 4 seconds on both ports, the call is classified as a facsimile call 27. Of course, detecting a greater or fewer number of packets in a longer or shorter period of time may be chosen by one skilled in the art.

Figure 4:
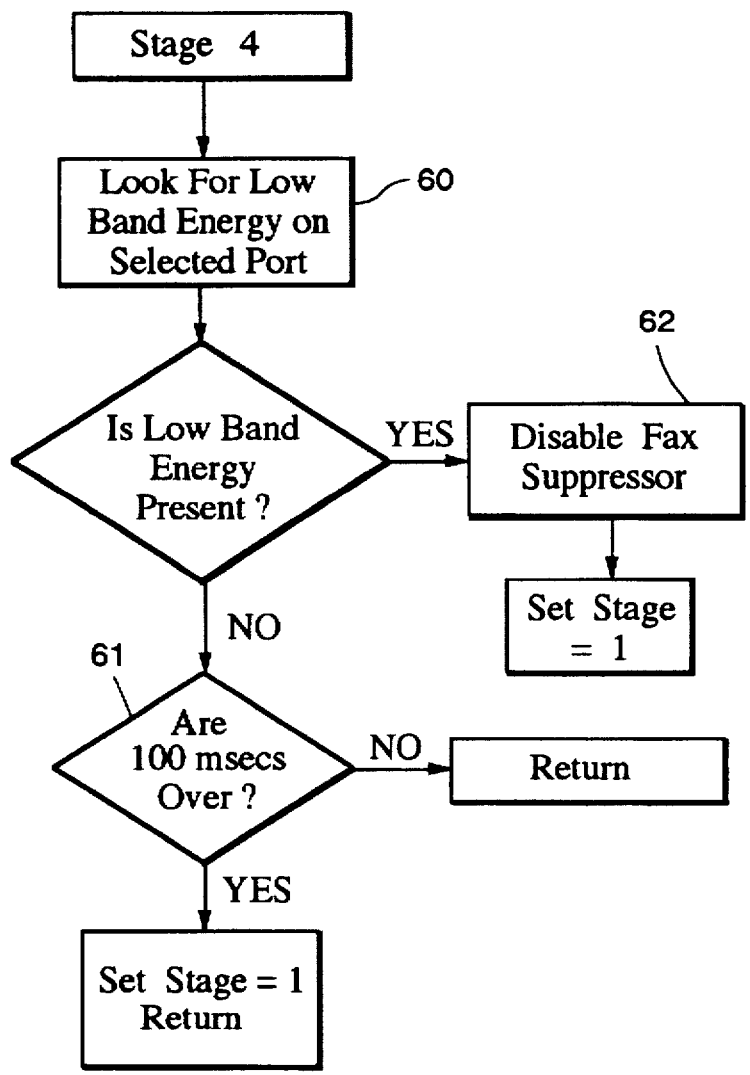

After identifying a facsimile transmission call, the echo suppressor for facsimile calls is activated. As seen in FIG. 4, once the echo suppressor is activated, the lower frequency band of the port with the greater energy is monitored for the presence of voice signals 60. If energy is detected in the lower band for more than 100 msecs 61, the signal classifier state is reset 62. This insures that the echo suppressor is disabled if the call is a incorrectly identified as a facsimile call or if the facsimile call terminates when the user switches back to a voice call.

The echo suppressor suppresses any echo on the transmit port if there is a signal present on the receive port with a hangover count of greater than zero. The hangover count is used to dictate the period of time which the echo suppressor is active after the transmission signal is sent to the receiver. The hangover time is incremented up to a count which corresponds to a maximum hangover time of preferably 50 msecs. A shorter or longer maximum hangover time can also be selected by one skilled in the art depending on the particular network application.

Figure 5:
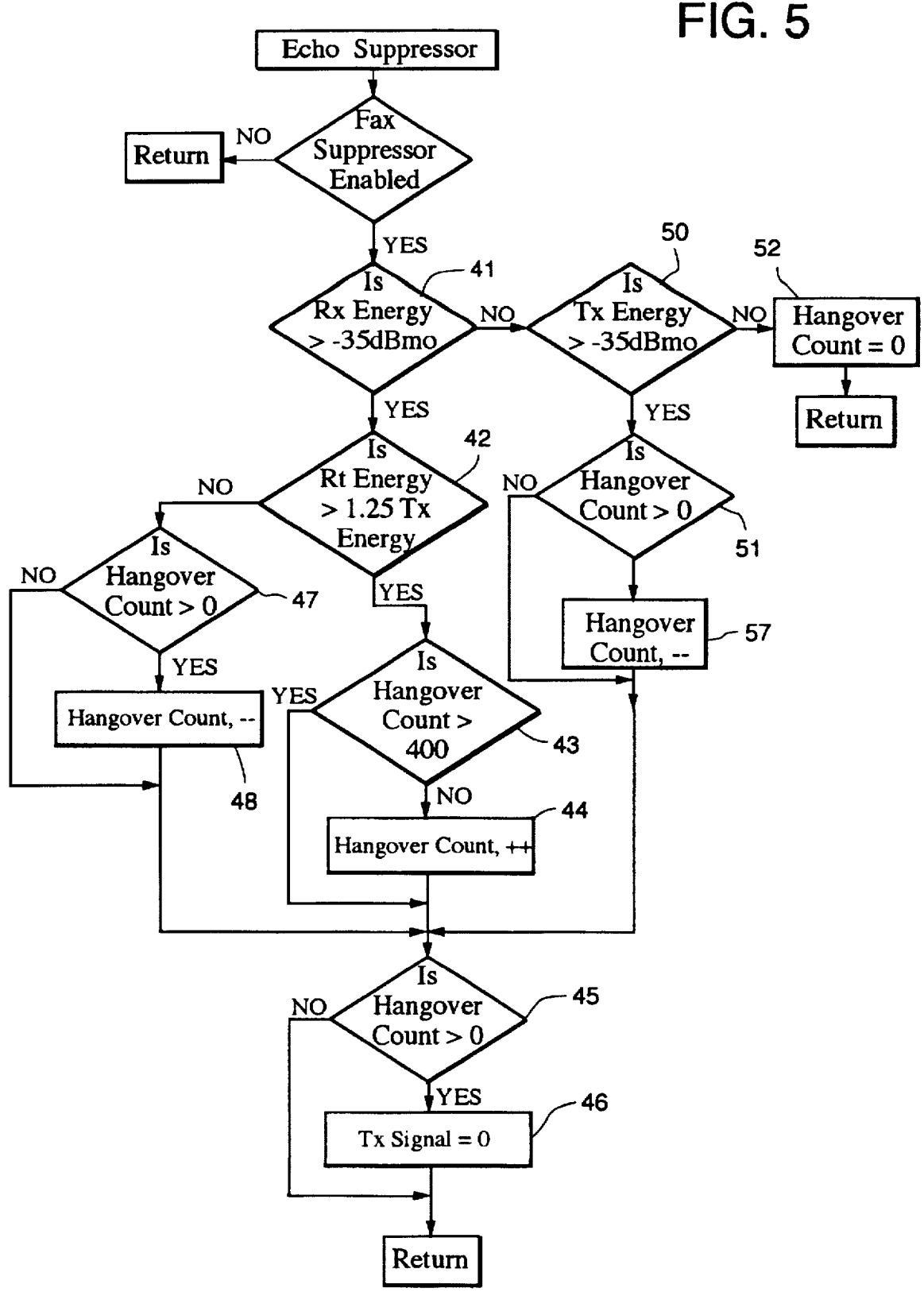
FIG. 5 shows a flow diagram of the echo suppressor.

The echo suppression method with a variable hangover time is shown in FIG. 5. First, the port with the higher energy is determined. If the higher energy port is a receive port, any signal on the transmit port is suppressed and a hangover count may be decremented or incremented. A shown in FIG. 5, if the receive energy is greater than −35 dBmo 41 and 1.25 times the transmit energy 42, the hangover count is incremented to a maximum of 400 43, 44. The transmit signal is also suppressed 46 all this time. If the receive energy is greater than −35dBmo 41, but not 1.25 times the transmit energy 42, the transmit signal is still suppressed if the hangover count is greater than zero. If the hangover count was greater than zero and the transmit signal suppressed, the hangover count is decremented 48.

If the transmit port has the higher energy, the transmit signal is suppressed as long as the energy is above a minimum threshold and the hangover count is greater than zero. Preferably, as seen in FIG. 5, if the transmit port energy is greater than −35 dBmo 50 the hangover count is decremented 52. If the hangover count remains greater than zero, the transmit port signal is then suppressed 46. If the transmit port signal falls below the threshold, the hangover count is immediately set to zero. This fast turnaround avoids problems in traditional echo suppressors.

If neither the receive energy 41 nor the transmit energy 42 is greater than the threshold, the hangover count is set to zero 53 and no echo suppression is performed.

The present invention has many advantages. It is fast and reliable in detecting facsimile calls and differentiating them from modem and voice calls. The present invention is also able to detect signal transitions with a high degree of accuracy in a small amount of time. This is to say it has a fast turnaround which minimizes signal corruption. The present invention also promptly deactivates/activates when facsimile calls switch to voice calls and vice-versa. The present invention can improve facsimile call retention rates.

We claim:

1. A method of suppressing echo on a facsimile transmission comprising the steps of:

determining that a transmission is a facsimile transmission;

enabling a facsimile echo suppressor if the transmission is a facsimile transmission;

comparing a received signal energy of a received signal at a receive port to a first signal level value if the facsimile echo suppressor is enabled;

comparing the received signal energy to a transmit signal energy of a transmit signal at a transmit port if the received signal energy is greater than a first signal level value;

incrementing a hangover count if the received signal energy is greater than the first signal level value and the received signal energy is greater than the transmit signal energy; and suppressing the transmit signal if the hangover count is greater than zero.

2. The method of claim 1 where the hangover count is incremented up to a maximum hangover count value corresponding to a maximum hangover time of 50 msecs.

3. The method of claim 1 where the first signal level value is about −35 dBmo.

4. The method of claim 1 where the received signal energy of the receive port is compared to about 1.25 times the transmit signal energy of the transmit port.

5. The method of claim 1 where the hangover count is incremented to a maximum of 400.

6. The method of claim 1 further comprising the steps of:

decrementing the hangover count if the received signal energy is not greater than the transmit signal energy of the transmit port; and suppressing the transmit signal if the hangover count is greater than zero.

7. The method of claim 6 where the hangover count is decremented to a minimum of 0.

8. The method of claim 1 further comprising the steps of:

comparing the transmit signal energy to a second signal level value if the received signal energy is not greater than the first signal level value.

9. The method of claim 8 where the second signal level value is about −35 dBmo.

10. The method of claim 8 further comprising the steps of:

decrementing the hangover count if the transmit signal energy is greater than the second signal level value and the hangover count is greater than zero; and suppressing the transmit signal if the hangover count is greater than zero.

11. The method of claim 8 further comprising the steps of:

setting the hangover count to zero if the transmit energy is not greater than the second signal level value.

12. The method of claim 8 where the second signal level value is about −35 dBmo.

13. A method of suppressing echo on a facsimile transmission, comprising the steps of:

determining that a transmission is a facsimile transmission;

enabling a facsimile echo suppressor if the transmission is a facsimile transmission;

comparing a received signal energy of a received signal at a receive port to a first signal level value if the facsimile echo suppressor is enabled;

comparing the received signal energy to a transmitted signal energy of a transmitted signal at a transmit port if the received signal energy is greater than a first signal level value;

incrementing a hangover count if the received signal energy is greater than the first signal level value and the received signal energy is greater than the transmit signal energy suppressing the transmit signal if the hangover count is greater than zero and the received signal energy is greater than the first signal level value;

suppressing the transmit signal if the hangover count is greater than zero and the received signal energy is not greater than the first signal level value and the transmit signal energy is greater than a second signal level value; and canceling echo suppression if the received signal energy is not greater than the first signal level value and the transmit signal energy is not greater than the second signal level value.

14. A method of suppressing echo on a facsimile transmission, comprising the steps of:

determining that a transmission is a facsimile transmission; enabling a facsimile echo suppressor if the transmission is a facsimile transmission;

determining that a receive port is receiving a signal if the facsimile echo suppressor is enabled; and suppressing a transmit signal at a transmit port if the receive port receives a signal and the facsimile echo suppressor is enabled.

* * * * *